US012117978B2

United States Patent
Molakantalla et al.

(10) Patent No.: US 12,117,978 B2
(45) Date of Patent: Oct. 15, 2024

(54) REMEDIATION OF DATA QUALITY ISSUES IN COMPUTER DATABASES

(71) Applicant: KYNDRYL, INC., New York, NY (US)

(72) Inventors: Amaranatha Reddy Molakantalla, Bangalore (IN); Girish B Mohite, Bangalore (IN); Krishna Sumanth Gummadi, Bangalore (IN); Raj Kumar, Bangalore (IN); Nitik Kumar, Bangalore (IN)

(73) Assignee: Kyndryl, Inc., New York, NY (US)

(*) Notice: Subject to any disclaimer, the term of this patent is extended or adjusted under 35 U.S.C. 154(b) by 313 days.

(21) Appl. No.: 17/116,279

(22) Filed: Dec. 9, 2020

(65) Prior Publication Data

US 2022/0179835 A1 Jun. 9, 2022

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2322* (2019.01); *G06F 16/2433* (2019.01); *G06F 16/24573* (2019.01); *G06F 16/287* (2019.01)

(58) Field of Classification Search
CPC ............. G06F 16/215; G06F 16/24573; G06F 16/287; G06F 16/2433; G06F 16/2322
See application file for complete search history.

(56) References Cited

U.S. PATENT DOCUMENTS 11,086,827 B1 * 8/2021 Saimanee ............... G06F 16/211
11,176,107 B2 * 11/2021 Xu ......................... G06F 16/215
(Continued)

FOREIGN PATENT DOCUMENTS

CN 110263229 A 9/2019

OTHER PUBLICATIONS

"Monitoring the Data Lake: Detecting Data Anomalies in ETL Pipelines", YouTube, Intermix Software, Jan. 15, 2019, 3 pages, <https://www.youtube.com/watch?v=ZfGxxMBnMJY&feature=emb_logo>.

(Continued)

*Primary Examiner* — Alex Gofman
*Assistant Examiner* — Suman Rajaputra
(74) *Attorney, Agent, or Firm* — CANTOR COLBURN LLP; Dan Housley

(57) ABSTRACT

A computer remediates data quality issues in a consolidated data record includes elements from several datasets, comprising. The computer determines, based at least in part on dataset feed information, dataset flow quality value for first and second datasets for a consolidated data record resulting from combining a plurality of datasets. The datasets include associated metadata. The computer, responsive to flow quality value determinations, compares dataset flow quality values with a predetermined dataset flow quality threshold and conducts a correction action for datasets with dataset flow quality value beyond the threshold. The computer determines, based at least in part on said dataset element health information, dataset health quality values for the datasets. The computer, compares the health quality values with a predetermined dataset health quality threshold and conducts a dataset health quality correction action for datasets having a dataset health quality value beyond the dataset health quality threshold.

20 Claims, 6 Drawing Sheets

(51) Int. Cl.
*G06F 16/23* (2019.01)
*G06F 16/242* (2019.01)
*G06F 16/2457* (2019.01)
*G06F 16/28* (2019.01)

(56) References Cited

U.S. PATENT DOCUMENTS

| | | |
|---|---|---|
| 2006/0136461 A1 | 6/2006 | Lee |
| 2016/0267082 A1* | 9/2016 | Wong ................... G06F 16/164 |
| 2016/0364434 A1* | 12/2016 | Spitz ......................... G06F 8/65 |
| 2018/0373781 A1 | 12/2018 | Palrecha |
| 2019/0155822 A1 | 5/2019 | Shkapenyuk |
| 2019/0325323 A1* | 10/2019 | Walthers ................ G06N 20/00 |
| 2022/0004822 A1* | 1/2022 | Vaid ....................... G06N 20/00 |

OTHER PUBLICATIONS

Gorelik, Alex, "Managing Data Lakes Across a Hybrid Cloud Environment", Transforming Network Infrastructure, Virtualization Featured Article, Mar. 13, 2018, 2 pages, <https://www.transformingnetworkinfrastructure.com/topics/virtualization/articles/437426-managing-data-lakes-across-hybrid-cloud-environment.htm>.

Mell, et al., "The NIST Definition of Cloud Computing", National Institute of Standards and Technology, Special Publication 800-145, Sep. 2011, 7 pages.

Singh, Kartik, "What is Data Lake and How to Improve Data Lake Quality", Dimensionless Technologies PVT Ltd blog, Apr. 5, 2019, 7 pages, <https://dimensionless.in/what-is-data-lake-and-how-to-improve-data-lake-quality/>.

Zhou, et al., "A Semantic Schema for Data Quality Management in a Multi-Tenant Data Platform", Aug. 28, 2019, 10 pages, <https://arxiv.org/pdf/1908.10754.pdf>.

* cited by examiner

| Dataset # | Record # | Data Source # | Record Generation Timestamp | Health Quality Attribute Value | Consolidated Record (CR) ID# | CR Mapping Code | Record Element Data Type | Record Element Value |
|---|---|---|---|---|---|---|---|---|
| 1 | 1 | 1 | time 1 | Value 1 | 1 | A | Type 1 | Value 1 |
| 1 | 2 | 1 | time 1 | Value 1 | 1 | C | Type 2 | Value 2 |
| 2 | 1 | 2 | time 2 | Value 2 | 1 | B | Type 1 | Value 3 |
| 2 | 2 | 2 | time 3 | Value 3 | 1 | D | not classified | null |

FIG. 3 

| CR ID# | CR Mapping Code | Record Element Data Type | Record Element Value | Data Source | Consolidated Record Element Value |
|---|---|---|---|---|---|
| 1 | A | Type 1 | Value 1 | 1 | CEV 1 |
| 1 | B | Type 1 | Value 3 | 2 | CEV 1 |
| 1 | C | Type 2 | Value 2 | 1 | CEV 2 |
| 1 | D | unclassified | null | 2 | CEV 2 |

FIG. 4 

| Dataset # | Age Threshold | Health Attribute Threshold (%) | Consolidation Confidence Threshold (%) |
|---|---|---|---|
| 1 | Age value 1 | Value 1 | Value 1 |
| 2 | Age value 2 | Value 2 | Value 2 |

FIG. 5 

REMEDIATION OF DATA QUALITY ISSUES IN COMPUTER DATABASES

BACKGROUND

The present invention relates generally to the field of data quality in computer databases, and more specifically, to improving the data quality in data stores, such as data lakes.

Data lakes are data repositories that can accept and store large amounts of structured and unstructured data from multiple sources. Data may be provided to a data lake in ongoing streams or in periodic batches and is often raw data which is largely unprocessed. Some data lake sources provide data in an ad hoc manner, and data may arrive inconsistently, with some data streams being more reliable than others. If data delivered to the data lake for downstream processing has become obsolete or irrelevant, processing accuracy will suffer.

Data sources can include multiple online tenants or other sources accounts and, given the wide variety of sources and supply arrangements, content sent to a data lake can vary widely in quality. When a data lake contains poor quality data, conclusions made using the data are often inaccurate.

SUMMARY

According to one embodiment, a computer-implemented method to remediate data quality issues in a consolidated data record that includes elements from a plurality of datasets, including determining by the computer, based at least in part on dataset feed information, a first dataset flow quality value for a first dataset and a second dataset flow quality value for a second dataset for a consolidated data record resulting from combining a plurality of datasets, each of the first and the second datasets including respective sets of associated metadata. The computer, in response to the dataset flow quality value determinations, compares the dataset flow quality values with a predetermined dataset flow quality threshold. In response to the determination and, in response, conducting, by said computer, a consolidated data record dataset flow quality correction action for datasets having a dataset flow quality value beyond said dataset flow quality threshold. The computer determines, based at least in part on said dataset element health information, a first dataset health quality value for said first dataset and a second dataset health quality value for said second dataset. In response to the dataset health quality value determinations, the computer compares the health quality values with a predetermined dataset health quality threshold. In response to the comparison, the computer conducts a dataset health quality correction action for datasets having a dataset health quality value beyond the dataset health quality threshold. According to aspects of the invention, the dataset feed information includes, for each dataset, a dataset age threshold and content sufficient for said computer to determine a dataset age. The computer determines, for each dataset, the dataset age and the dataset flow quality value determinations are based, at least in part, on whether the respective determined dataset ages are greater than the associated dataset age thresholds. The computer determines dataset flow quality values to be beyond said dataset flow quality threshold when the associated dataset age is greater than the associated element age value threshold. According to aspects of the invention, the computer receives content sufficient for the computer to determine the dataset age in response to a Structured Query Language (SQL) request made by the computer. The request returns, for an associated dataset, a dataset flow query timestamp indicating a chronological time associated with said dataset flow quality value determination, and a representative element timestamp indicating a chronological time when a representative element in the associated dataset was generated. The associated dataset ages are each based, at least in part, on a time difference between the dataset flow query timestamps and associated representative element timestamps. According to aspects of the invention, the metadata further includes at least one dataset attribute selected from a list consisting of a dataset source account label, and at least one data element type label; and the consolidated data record dataset flow quality correction action includes providing a message to a user interface operatively associated with the data sources associated with datasets having a dataset flow quality value beyond the dataset flow quality threshold indicating the flow quality and associated attribute thereof. According to aspects of the invention, the computer, in response to providing the message, receives at least one corrected dataset from a data source associated with the dataset for which the message was sent. According to aspects of the invention, each of the dataset health quality values corresponds to a data health attribute selected from a list consisting of data completeness, data consistency, data accuracy, data validity. The dataset health quality information includes, for each dataset, an acceptable value threshold associated with said selected data health attribute, and content sufficient for said computer to determine a dataset value for the selected data health attribute, and the computer determines, for each dataset, a dataset value for the selected data health attribute. The dataset health quality value determinations are based, at least in part, on whether said respective determined dataset value for the selected data health attribute is greater than said data health acceptable value threshold associated with the selected data health attribute. The computer determines the dataset health quality values to be beyond said dataset health quality threshold when the determined dataset value for the selected data health attribute is greater than the acceptable value threshold associated with the selected attribute. According to aspects of the invention, the metadata further includes at least one dataset attribute selected from a list consisting of a dataset source account label, and at least one data element type label; and the dataset health quality correction action includes providing a message to a user interface operatively associated with the data sources associated with datasets having a dataset health quality value beyond said dataset health quality threshold indicating the flow quality thereof. According to aspects of the invention, the computer, in response to providing the message, receives at least one corrected dataset from a data source associated with the dataset for which the message was sent. According to aspects of the invention, the metadata includes a consolidation confidence threshold for the at least one consolidated data record. The computer determines, for a selected one of said at least one consolidated data records, a first consolidation confidence value and a second consolidation confidence value based, at least in part, on a preselected attribute of the respective elements associated with said first field and said second field. The computer compares the consolidation confidence values of the selected consolidated data record to the consolidation confidence threshold and, based on the comparison, determines whether either of the consolidation confidence values for the selected consolidated data record is unacceptable and provides, in accordance with the determination, a message indicating the unacceptability to a user interface operatively associated with the data sources of element having said unacceptable consolidation confidence value. According to aspects of the invention, the preselected attribute is a status value of the elements associated with the first and second fields, and the consolidation confidence value is determined by the computer to be unacceptable based, at least in part, on an associated element status value being a null set.

According to another embodiment, a system to remediate data quality issues in a consolidated data record that includes elements from a plurality of datasets, which comprises: a computer system comprising a computer readable storage medium having program instructions embodied therewith, the program instructions executable by a computer to cause the computer to: determine, based at least in part on dataset feed information, a first dataset flow quality value for a first dataset and a second dataset flow quality value for a second dataset for a consolidated data record resulting from combining a plurality of datasets, each of the first and the second datasets including respective sets of metadata associated therewith; responsive to said dataset flow quality value determinations, compare said dataset flow quality values with a predetermined dataset flow quality threshold and, in response, conduct a consolidated data record dataset flow quality correction action for datasets having a dataset flow quality value beyond said dataset flow quality threshold; determine, based at least in part on said dataset element health information, a first dataset health quality value for said first dataset and a second dataset health quality value for said second dataset; and responsive to said dataset health quality value determinations, compare said health quality values with a predetermined dataset health quality threshold and, in response, conduct a dataset health quality correction action for datasets having a dataset health quality value beyond said dataset health quality threshold.

According to another embodiment, a computer program product to remediate data quality issues in a consolidated data record that includes elements from a plurality of datasets, the computer program product comprising a computer readable storage medium having program instructions embodied therewith, the program instructions executable by a computer to cause the computer to: determine, using said computer, based at least in part on dataset feed information, a first dataset flow quality value for a first dataset and a second dataset flow quality value for a second dataset for a consolidated data record resulting from combining a plurality of datasets, each of the first and the second datasets including respective sets of metadata associated therewith; responsive to said dataset flow quality value determinations, compare, using said computer, said dataset flow quality values with a predetermined dataset flow quality threshold and, in response, conduct, using said computer, a consolidated data record dataset flow quality correction action for datasets having a dataset flow quality value beyond said dataset flow quality threshold; determine, using said computer, based at least in part on said dataset element health information, a first dataset health quality value for said first dataset and a second dataset health quality value for said second dataset; and responsive to said dataset health quality value determinations, compare, using said computer, said health quality values with a predetermined dataset health quality threshold and, in response, conduct a dataset health quality correction action for datasets having a dataset health quality value beyond said dataset health quality threshold.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 3 is a table schematically showing aspects of datasets in a data lake according to aspects of the invention.

FIG. 4 is a table schematically showing aspects of a consolidated record incorporating elements of the datasets shown in FIG. 3 arranged in accordance with a mapping table according to aspects of the invention.

FIG. 5 is table schematically showing aspects of metadata of the datasets shown in FIG. 3 and consolidated record shown in FIG. 4.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
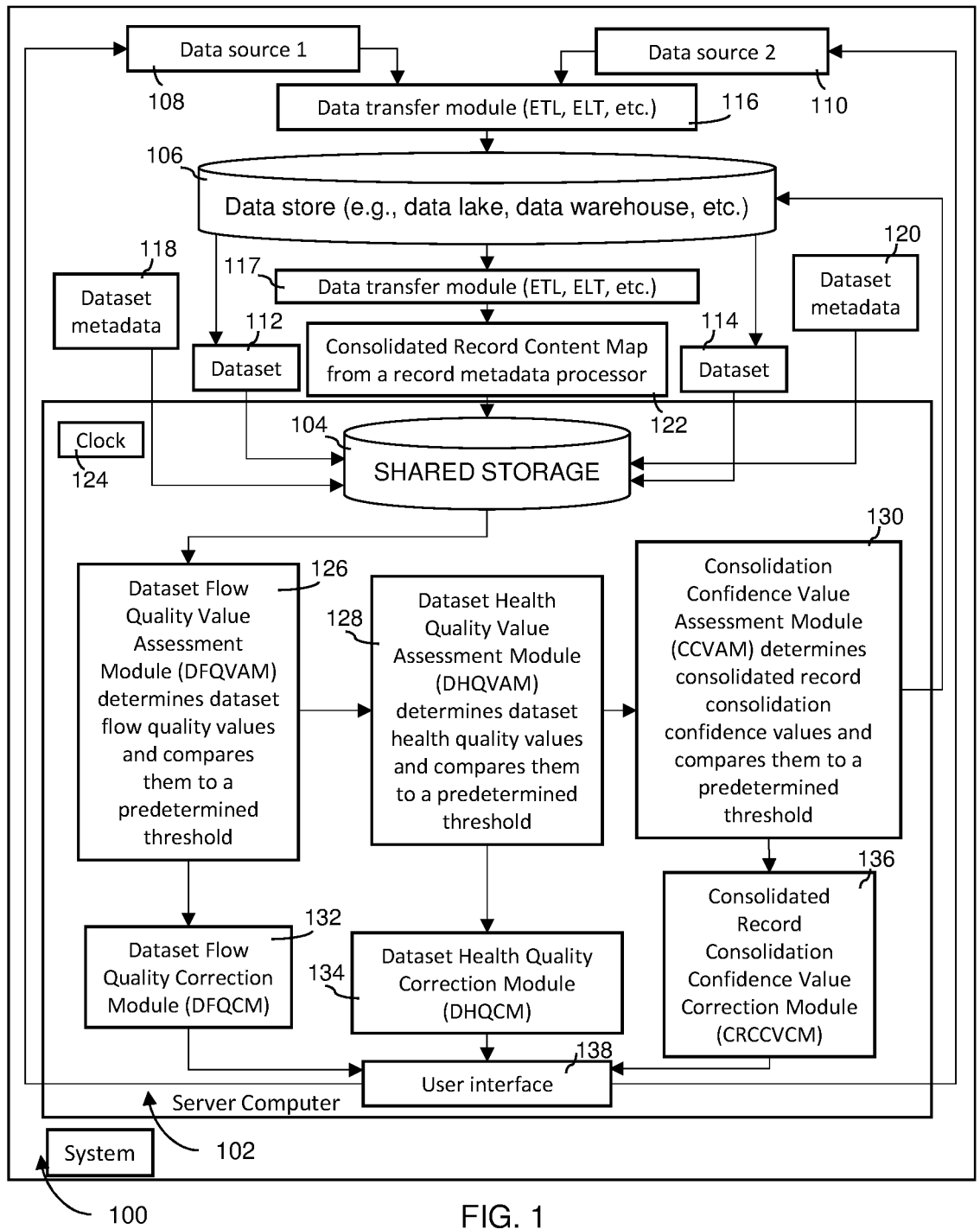
FIG. 1 is a schematic block diagram illustrating an overview of a system for a computer-implemented method to remediate data quality issues in a consolidated data record that includes elements from a plurality of datasets according to embodiments of the present invention.
Figure 2:
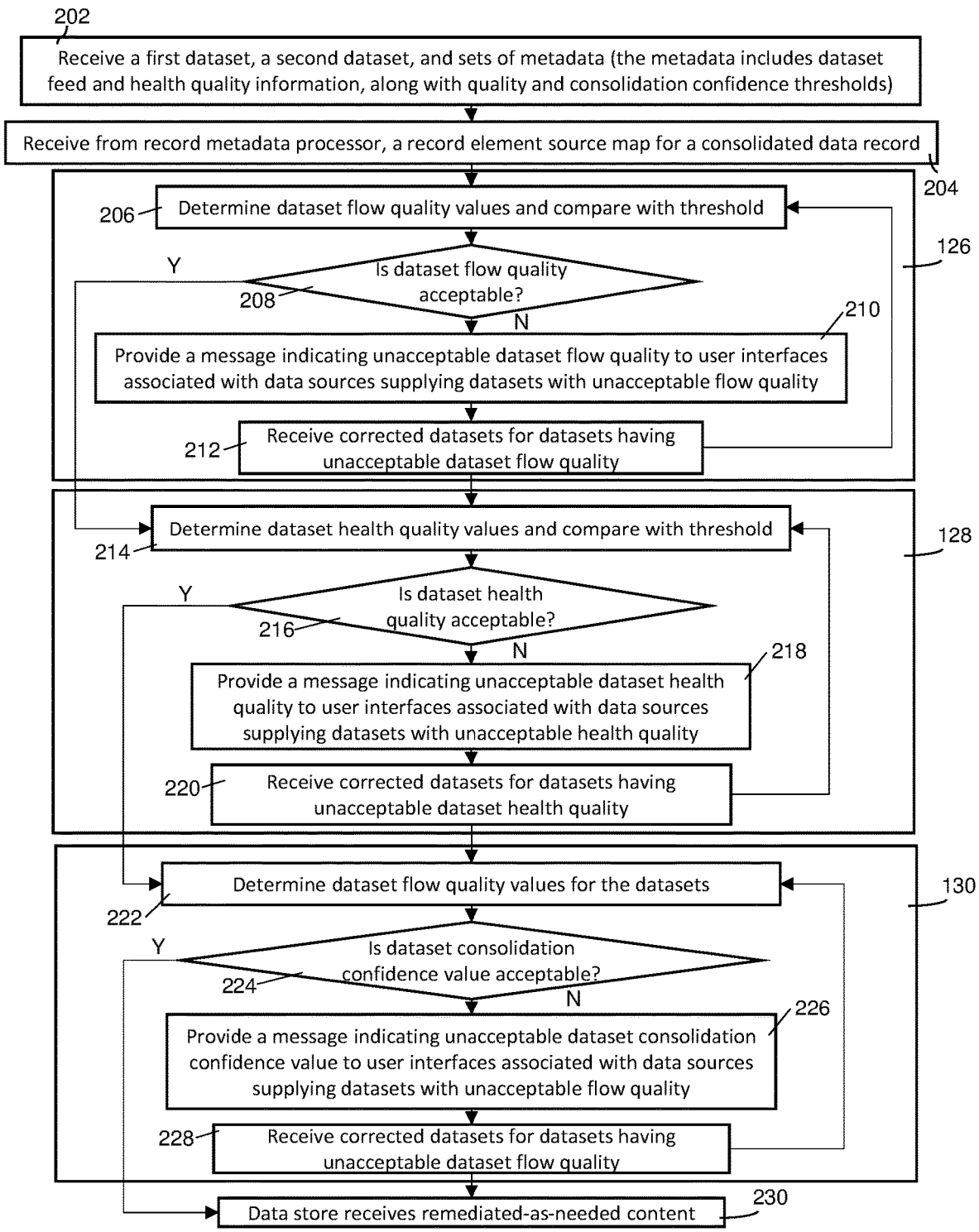
FIG. 2 is a flowchart illustrating a method, implemented using the system shown in FIG. 1, of remediating data quality issues in a consolidated data record that includes elements from a plurality of datasets according to aspects of the invention.

Now with combined reference to the Figures generally and with particular reference to FIG. 1 and FIG. 2, an overview of a computer-implemented method to remediate data quality issues in a consolidated data record that includes elements from a plurality of datasets usable within a system 100, as carried out by a server computer 102 having optionally shared storage 104 and aspects that ensure a data lake, data warehouse, or other data store 106 receives remediated-as-needed content, according to an embodiment of the present disclosure is shown.

The server computer 102 is in operative contact with several data sources 108, 110, with each data source providing associated data sets 112, 114 via an optional data transfer modules (e.g., extract, transform, load (ETL) module; extract, load, transform (ELT) module; etc.) 116, 117. The server computer 102 is in contact with sources of metadata for the datasets 112,114, and receives corresponding sets of dataset metadata 118, 120. The sever computer 102 is also in contact with a record metadata source that provides an element content map for a consolidated record 400 (e.g., as seen in FIG. 4) that combines, reconciles, links, or otherwise incorporates elements from the datasets 112, 114. According to aspects of the invention, the consolidated record 400 includes elements from more than one data source 108,110 and may include elements having different data types 316. The server computer 102 includes a clock 124 or similar device to generate chronological time data as necessary according to aspects of the invention. A Data Flow Quality Value Assessment Module (DFQVAM) 126 of the server computer 102 determining dataset flow quality values and compares them to a predetermined dataset flow quality threshold (which, in some embodiments of the invention, is associated with data age) 502 (e.g., as seen in table 500 of FIG. 5). A Dataset Health Quality Value Assessment Module (DHQVAM) 128 of the sever computer 102 determines dataset health quality values and compares them to a predetermined dataset health attribute threshold 504 (e.g., as seen in FIG. 5). A Consolidation Confidence Value Assessment Module (CCVAM) 130 of the server computer 102 determines consolidated record consolidation confidence values and compares them to a predetermined consolidation confidence threshold 506 (e.g., as seen in FIG. 5). A Dataset Flow Quality Correction Module (DFQCM) 132 sends a message to a user interface identifying datasets 118,120 with unacceptable flow quality. A Dataset Health Quality Correction Module (DHQCM) 134 sends a message to a user interface identifying datasets 118,120 with unacceptable health quality. A Consolidated Record Consolidation Confidence Value Correction Module (CRCCVCM) 136 sends a message to a user interface identifying datasets 118,120 with unacceptable consolidation confidence values. A user interface 138 receives messages from the various correction modules 132, 134, 136 regarding dataset issues and requests corrected datasets from the associated data sources 108,110 in response to the messages. According to aspects of the invention, this ensures that flow, health, and consolidation quality issues for data provided to the data lake 106 are remediated on an as needed basis, thereby increasing confidence in computations made based on the data lake content. Additionally, by reducing the number of false positives and other data lake content-based errors, aspects of the present invention increase the overall computational efficiency of generating computations based on data lake content.

Now with reference specifically to FIG. 2, and to other figures generally, a method to remediate data quality issues in a consolidated data record that includes elements from a plurality of datasets 112,114 sourced from a data lake 106, using the system shown in FIG. 1, will be described. The server computer 102 receives, at block 202, datasets 112, 114 from respective data sources 108,110 and metadata 118,120. According to aspects of the invention, the metadata 118,120 includes dataset feed information 308 and health quality information 310, along with quality 502, 504 and consolidation confidence 506 thresholds.

Exemplary dataset content according to aspects of the invention, is shown in table 300. In one embodiment, each dataset record includes a dataset number 302, an individual dataset record number 304. Data records also include a data source identifier 306 showing which source provided the associated record, a record generation timestamp 308 that indicates, chronologically, when the associated record was generated, and an HQAV 310 (which indicates some measurable attribute for the record selected by one of skill in this field to assess data health quality (as discussed more fully below).

The server computer 102 receives, at 204 receive from record metadata processor (not shown), a record element source map for a consolidated data record 400 (e.g., as shown in use in FIG. 4). With additional reference to FIG. 3, some information from the metadata processor is incorporated into the dataset content shown in table 300. For example, the dataset content includes a Consolidated Record (CR) ID #312 that identifies whether the record is associated with a consolidated record 400 (and if so, which one). Some dataset records include a CR Mapping Code 314 which indicates to which field, within a CR 400 identified by a CR ID #312, a dataset record is associated. According to aspects of the invention, the CR Mapping Code 314 ensures various dataset record elements are incorporated properly into consolidated records generated from within a single dataset, from multiple datasets 112,114, and even from across multiple data sources 108,110. Some dataset records include a Record Element Data Type (REDT) 316 that documents record data type classifications associated with some records. According to aspects of the invention, a record that should be classified—and which is not—can indicate poor dataset data health quality. More particularly, as shown in FIG. 3, data records can include several fields, including a data type classification field 316. When this field 316 is empty (e.g., as when characterized by a null set value), it can be said that the record is unclassified, and this missing value indicates a low quality data record. In this way, REDT 316 values can act as supplemental HQAVs 310, indicating trouble within the dataset 112,114 when missing. Some dataset records include an individual record element value 318 associated with the content represented by the associated data source 108,110. According to aspects of the invention, the record element values 318 can be directly measured or otherwise registered by a sensor or other data source 108,110 associated with the dataset 112,114.

With particular reference to FIG. 4, the consolidated record 400 is shown with fields and elements arranged according to the record element source map, including the consolidated record ID #312, CR Mapping Code 314, Record Element Data Type 316, Record Element Value 318, and Data Source 306 fields described above. With continued reference to FIG. 4, the consolidated record also includes at least one Consolidated Record Element (CREV) 320 that is associated with an elements from each dataset 112,114. According to aspects of the invention, the CREVs 320 can be independent elements selected directly from one of the data sources 108,110, or they may be composite elements that combine various attributes of elements from the same of different data sources. In this manner, the consolidated record may be used to provide, for example enhanced incident tickets in a customer service troubleshooting use case. As used herein, the term "enhanced incident ticket" means a troubleshooting support ticket that includes information combined from several data sets 112,114. Enhanced incident tickets are one example of consolidated records (shown generally in FIG. 4) with elements that require information from a several data sources 108,110, including multiple sources in a multi-user, use case (e.g., multi-tenant, hybrid cloud-based network environment with multiple data types, etc.). Consolidated records (including, for example, enhanced incident tickets and other multi-source records) can provide useful data analytics, offering insights not available from records from only one dataset. Since consolidated records include information from several data sets, it can be difficult to ensure high quality analytics if a data source 108,110 is providing low quality data, and aspects of the present invention detect this condition and address this concern.

The server computer 102 determines dataset flow quality values 308, compares the them to a predetermined flow quality threshold 502, and requests corrections as needed through communication with a user interface 138 associated with the data sources 108,110, in blocks identified collectively as the Dataset Flow Quality Value Assessment Module (DFQVAM) 126. According to aspects of the invention, the server computer 102, in block 206 determines dataset flow quality values 308 (e.g., a record timestamp or similar age indicator) and compares each value with an associated flow quality threshold value e.g., an acceptable dataset age threshold). According to aspects of the invention, the dataset feed information 308 is related to data age for a representative element (e.g., first element, last element, etc.). The dataset feed information 308, indicates a dataset element average age, or some other representative age information selected by one skilled in this filed and helps indicate the relative recency of the data, as a way to measure data flow quality for both structured and unstructured data. Is noted that an element age value 308 may be associated with a timestamp that (depending on several factors, including data source, data type, etc.) is delivered as part of the dataset 112,114 content or may be generated by the clock 124 associated with the server computer 102. It is noted that the dataset feed information 308 may be an age value specific or may be a timestamp with which the server computer 102 may calculate an age value. The time may include typical hour/minute/second information and may also include day/month/year indication (or other relevant date information) as selected by one skilled in this field. According to aspects of the invention, the server computer determines dataset age by computing the chronological difference between a dataset flow query timestamp (not shown) that indicates a chronological time associated with a dataset flow quality value determination (e.g., when the server computer 102 executes an SQL request or similar time-indicating query as selected by one of skill in this field) and an element age value 308 provided as part of dataset content. The server computer uses the difference between these two time values to identify the dataset age, as a way of determining dataset flow quality. If flow has stopped, stalled, or slowed unexpectedly, it can indicate unacceptable flow quality, and the server computer will compare the computed age against the dataset flow quality threshold 502 (which, according to aspects of the invention, and as shown in FIG. 5, may be a data age threshold) to identify such flow anomalies. After determining dataset age, the server computer 102 will determine, whether the dataset age is older than the age threshold 502 and will determine data flow quality to be acceptable if dataset age is below the age threshold. If data flow quality is acceptable (as indicated in some aspects of the invention, by dataset age), the server computer 102 processing continues in the Dataset Health Quality Value Assessment Module (DHQVAM) 128. However, if the server computer 102 determines, at block 208, that flow quality of one of the datasets 112,114 is unacceptable, the server computer 102 will initiate a corrective action at block 210 for the associated dataset. In particular, the server computer 102 provides, at block 210, a message indicating unacceptable dataset flow quality to a user interface 138 associated with the data sources supplying datasets with unacceptable flow quality. According to aspects of the invention, the sever computer 102 receives, at block 212, corrected datasets for datasets originally having unacceptable dataset flow quality when assessed. According to aspects of the invention, the corrected datasets are passed back to block 206, where the server computer 102 will re-assess the dataset flow quality via Dataset Flow Quality Value Assessment Module (DFQVAM) 126. Once corrected datasets 112,114 have acceptable data flow quality, as described above, processing moves on to Dataset Health Quality Value Assessment Module (DHQVAM) 128. According to aspects of the invention, the server computer 102 continues to request dataset corrections for datasets with unacceptable flow quality, until a dataset of adequate flow quality is provided.

The server computer further processes datasets 112,114 that have flow quality which exceeds the provided flow quality threshold 502 in blocks collectively called the Dataset Health Quality Value Assessment Module (DHQVAM) 128. In particular, the server computer 102 notes dataset health quality attribute values 310, compares the them to a predetermined flow quality attribute standard 504, and requests corrections as needed through communication with a user interface 138 associated with data sources 108,110 having unacceptable data health quality. According to aspects of the invention, a health quality attribute value HQAV 310 is a measurable value used to assess various aspects of dataset 112,114 content health (e.g., data completeness, data consistency, data accuracy, data validity, and so forth). In settings where dataset content is expected to follow predetermined patterns, deviation from (or adherence to) those patterns can be noted by comparing to a health quality attribute value HQAVs 310 to a health quality attribute target value (not shown) that is provided with dataset metadata 118,120. According to aspects of the invention, the HQAV 310 is value measurable for each dataset record 304 (e.g., as seen in FIG. 3) that should either have an expected value, fall within an expected value range, or otherwise relate predictably to a predetermined attribute value in a manner selected in accordance with the judgement of one skilled in this field. Although the server computer can obtain record HQAVs 310 in a variety of manners, in one suitable approach, the server computer 102 executes, in block 214, an SQL request or similar attribute value-fetching query as selected by one of skill in this field to return record HQAVs appropriate for the selected health quality attribute. According to aspects of the invention, the server computer 102 assess dataset health for each dataset 112,114, by comparing record HQAVs 310 with the health quality attribute target value and determining how many dataset records match the health quality attribute target value. As used herein, the term "match" means having a value within +/−10% of the target value, although other assessment standards can be selected by those skilled in this field. The server computer 102 compares the result of this matching determination, to the health quality attribute threshold value 504 to determine whether a dataset has acceptable data quality. For example, the server computer 102 may assess data health by computing a percentage of records matching the expected HQAV, a percentage of records matching range boundaries of the expected HQAV, and so forth, as needed to facilitate comparison to the HQAV threshold 504 provided in the dataset metadata 112,114. According to aspects of the invention, if the computed percentage exceeds the threshold value 504, the server computer determines the associated dataset health is acceptable. If data health quality is acceptable (as indicated in some aspects of the invention, by determining how many HQAVs 310 are above a presented standard), the server computer 102 processing continues in the Consolidation Confidence Value Assessment Module (CCVAM) 130. However, if the server computer 102 determines, at block 216, that health quality of one of the datasets 112,114 is unacceptable, the server computer 102 will initiate a corrective action at block 218 for the associated dataset, In particular, the server computer 102 provides, at block 218, a message indicating unacceptable dataset health quality to a user interface 138 associated with the data sources supplying datasets with unacceptable health quality. According to aspects of the invention, the sever computer 102 receives, at block 220, corrected datasets for datasets originally having unacceptable dataset health quality when assessed. According to aspects of the invention, the corrected datasets are passed back to block 214, where the server computer 102 will re-assess the dataset health quality via Dataset Health Quality Value Assessment Module (DHQVAM) 128. Once corrected datasets 112,114 have acceptable data health quality, as described above, processing moves on to Consolidation Confidence Value Assessment Module (CCVAM) 130. According to aspects of the invention, the server computer 102 continues to request dataset corrections for datasets with unacceptable health quality, until a dataset of adequate health quality is provided.

The server computer further processes datasets 112,114 that have health quality which exceeds the provided flow quality threshold 504 in blocks collectively called the Consolidation Confidence Value Assessment Module (CCVAM) 130. In particular, the server computer 102 notes dataset consolidation confidence attribute values 316, compares the them to a predetermined standard, and requests corrections as needed through communication with a user interface 138 associated with data sources 108,110 having an unacceptable consolidation confidence values. According to aspects of the invention, a dataset consolidation confidence value is based on whether certain consolidated record attributes 316,318 (e.g., Record Element Data Type and Record Element Value) include expected values (for example, on whether Record Element Data Type values 316 present proper classification information and whether Record Element Values 318 are present or contain a null value). The server computer 102 uses dataset consolidation confidence value to assess consolidated record 400 veracity (e.g., how likely are consolidated records 400 generated accurately, what is the likelihood that calculations based on consolidated records 400 are reliable, and so on). According to aspects of the invention, certain consolidated record attribute 316,318 expected values (e.g., record elements have a classification of either a first type or a second type, instead of being unclassified; consolidated record elements should have a value present, instead of containing a null set) and these expected values (or others selected by one skilled in this field) are provided with dataset metadata 118,120. According to aspects of the invention, the consolidation confidence value is based, on whether consolidated record attribute 316,318 have expected values as determined by the server computer 102. Although the server computer can obtain record HQAVs 310 in a variety of manners, in one suitable approach, the server computer 102 executes, in block 222, an SQL request or similar attribute value-fetching query as selected by one of skill in this field to return certain consolidated record attribute values 316,318. According to aspects of the invention, the server computer 102 assess dataset certain consolidated value for each dataset 112,114, by comparing consolidated record attribute 316,318 values with the consolidated record attribute 316,318 target values and determining how many dataset records mimic the consolidated record attribute target value. As used herein, the term "mimic" means belonging to a preestablished data type category 316 or having a record element value 318 other than "null set." It is noted that other assessment standards can be selected by those skilled in this field. The server computer 102 compares the result of this mimicking determination to the consolidation confidence threshold 506 to determine whether a dataset has an acceptable consolidation confidence value. For example, the server computer 102 may assess consolidation confidence by computing a percentage of records with an expected data type category 316 (e.g., a from a list of categories provided as part of metadata) or a percentage of record element values 318 having a "null set" value. According to aspects of the invention, if the computed percentage exceeds the threshold value 506, the server computer determines the associated dataset consolidation confidence value is acceptable. If data consolidation confidence value quality is acceptable, the server computer 102 processing is passed on to the continues in the Consolidation Confidence Value Assessment Module (CCVAM) 130. However, if the server computer 102 determines, at block 224, that health quality of one of the datasets 112,114 is unacceptable, the server computer 102 will initiate a corrective action at block 218 for the associated dataset, In particular, the server computer 102 provides, at block 226, a message indicating unacceptable dataset consolidation confidence value to a user interface 138 associated with the data sources supplying datasets with unacceptable consolidation confidence values. According to aspects of the invention, the sever computer 102 may indicate improper categorization or missing values and receives, at block 228, corrected datasets for datasets originally having unacceptable consolidation confidence values when assessed. According to aspects of the invention, the corrected datasets are passed back to block 222, where the server computer 102 will re-assess the dataset consolidation confidence value via Consolidation Confidence Value Assessment Module (CCVAM) 130. Once corrected datasets 112,114 have acceptable consolidation confidence values, as described above, the server computer processing is complete and, at block 230, remediated-as-needed content is available and may be sent to the data store 106. According to aspects of the invention, the server computer 102 continues to request dataset corrections for datasets with unacceptable health quality, until a dataset of adequate consolidation confidence value is provided.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
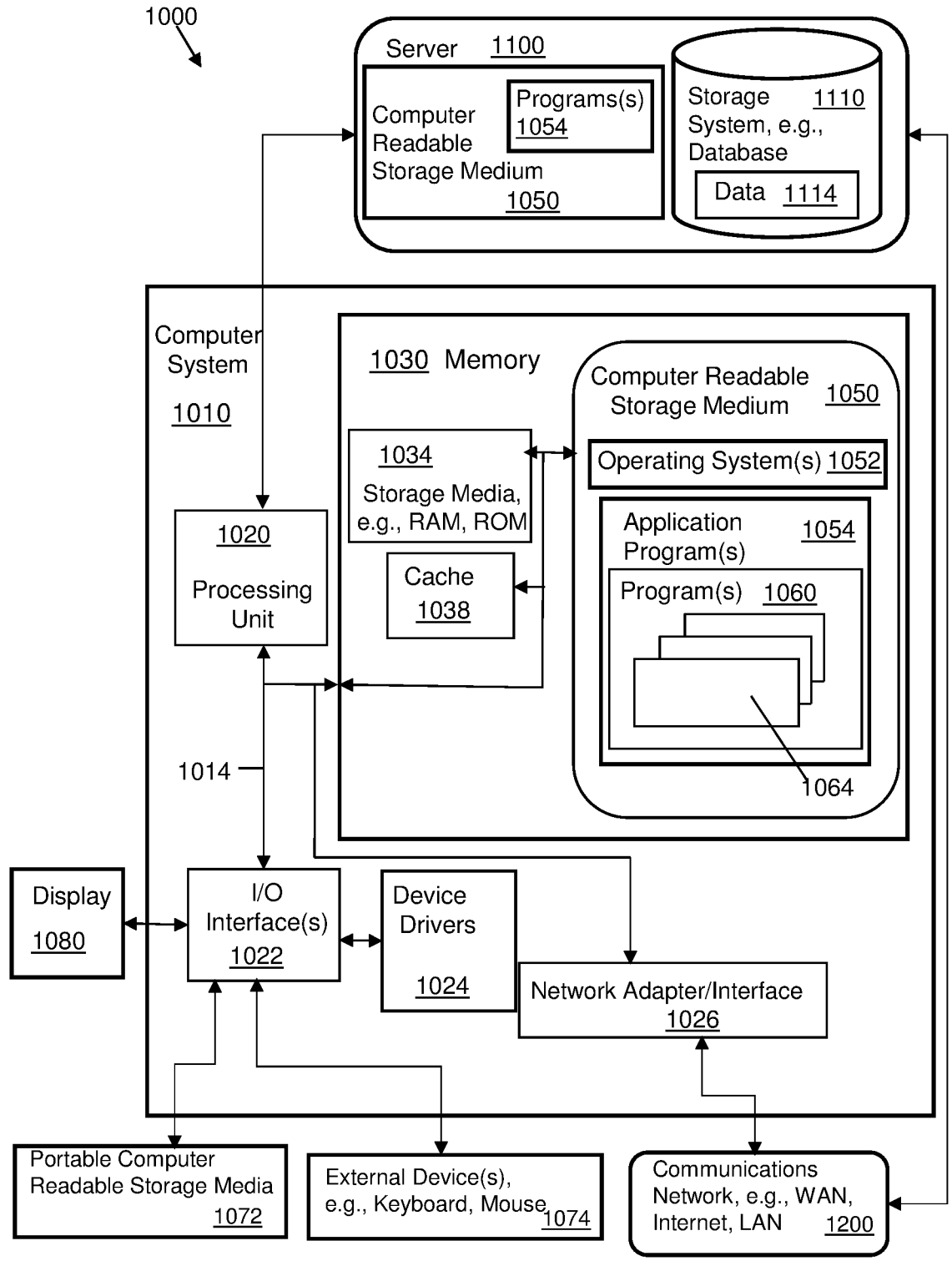
FIG. 6 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 6, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
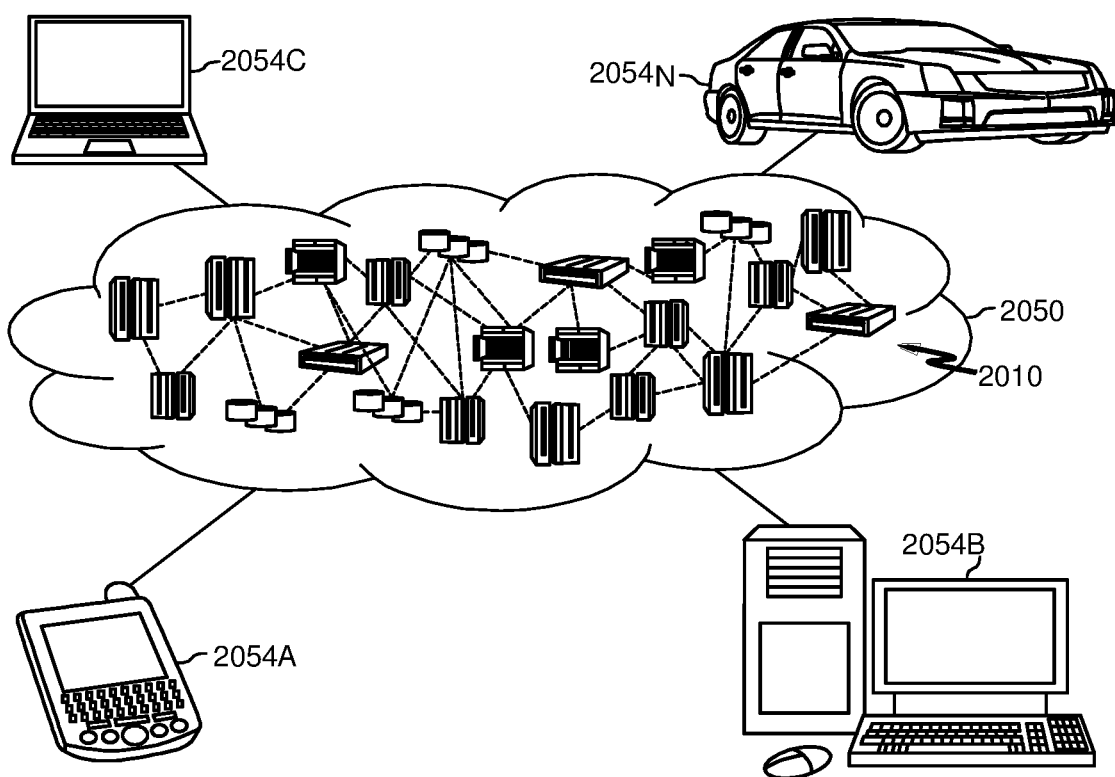
FIG. 7 depicts a cloud computing environment according to an embodiment of the present invention.

Referring now to FIG. 7, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 8:
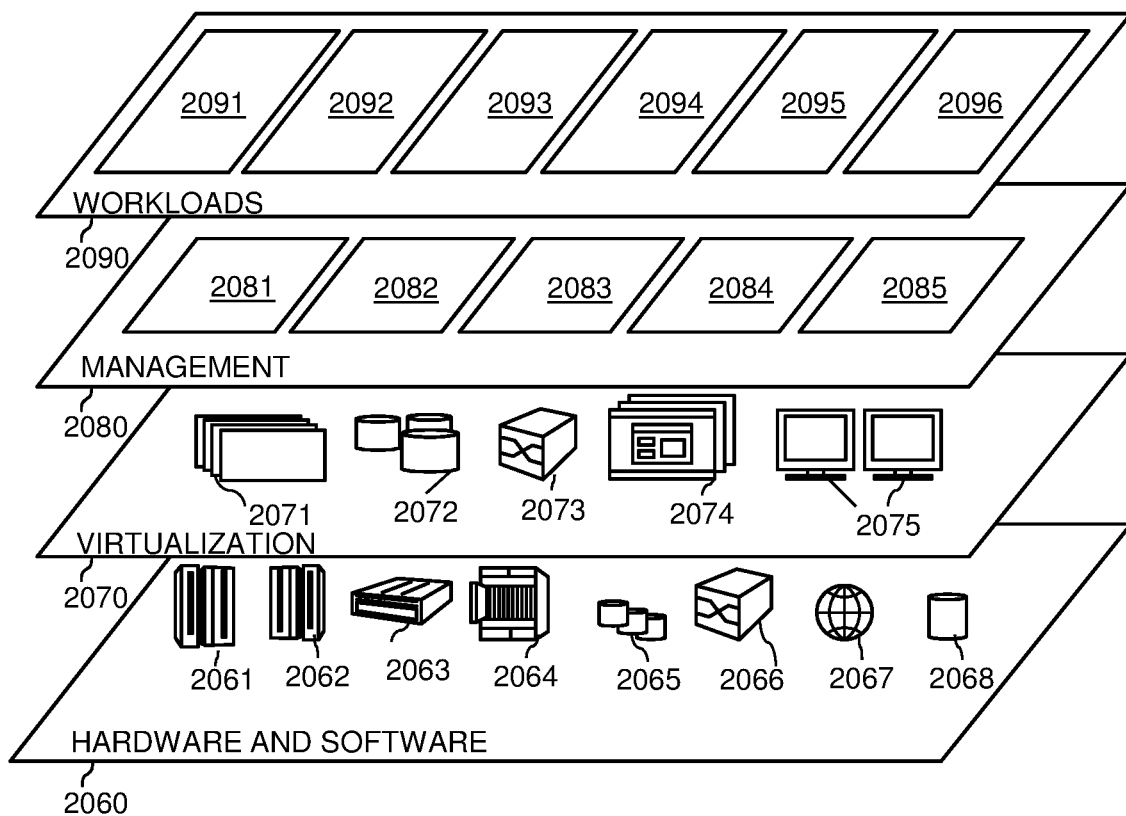
FIG. 8 depicts abstraction model layers according to an embodiment of the present invention.

Referring now to FIG. 8, a set of functional abstraction layers provided by cloud computing environment 2050 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and remediate data quality issues in a consolidated data record that includes elements from a plurality of datasets sourced from a data lake 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to remediate data quality issues in a consolidated data record that includes elements from a plurality of datasets, comprising: sourcing a first dataset from a data lake and a second dataset from the data lake; wherein sets of metadata respectively associated with the datasets are received with the first dataset and the second dataset; directly measuring, by said computer, based at least in part on dataset feed information, a first dataset flow quality value for the first dataset and a second dataset flow quality value for the second dataset for a consolidated data record resulting from combining a plurality of datasets, wherein the first dataset and the second dataset are based on incident tickets in a customer service troubleshooting use case; determining a predetermined dataset flow quality threshold value from the received metadata; responsive to said dataset flow quality value determinations, comparing, by said computer, said dataset flow quality values with the predetermined dataset flow quality threshold value and, in response, conducting, by said computer, a consolidated data record dataset flow quality correction action for datasets having a dataset flow quality value beyond said dataset flow quality threshold value until the datasets having a dataset flow quality value beyond said dataset flow quality threshold are corrected to have dataset flow quality values not beyond the dataset flow quality threshold value; responsive to a determination that all of the first dataset and the second dataset have and/or are corrected to have dataset flow quality values not beyond the dataset flow quality threshold value, determining, by said computer, based at least in part on dataset element health information, a plurality of first dataset health quality values for said first dataset and a plurality of second dataset health quality values for said second dataset, wherein the first dataset health quality values are based on a different type of health quality attribute, wherein the second dataset health quality values are based on different types of health_quality attributes, wherein the first dataset health quality values are determined by computing a percentage of the records of the first dataset that match boundaries of a range of first expected health quality attribute values (HQAVs), wherein the second dataset health quality values are determined by computing a percentage of the records of the second dataset that match boundaries of a range of second expected HQAVs; determining a plurality of acceptable dataset health quality threshold values from the received metadata; and responsive to said dataset health quality value determinations, comparing, by said computer, said health quality values with the determined acceptable dataset health quality threshold values and, in response, conducting, by said computer, a dataset health quality correction action for datasets having at least one dataset health quality value beyond an associated one of the determined acceptable dataset health quality threshold values that the at least one dataset health quality value is compared with.

2. The method of claim 1, wherein:
said dataset feed information includes, for the datasets, a dataset age thresholds and content sufficient for said computer to determine ages of the datasets;
wherein said computer determines a dataset age of the first dataset and a dataset age of the second dataset,
wherein the dataset age of the first dataset is an average age of elements of the first dataset,
wherein the dataset age of the second dataset is an average age of elements of the second dataset,
wherein the elements of the first dataset include both structured and unstructured data,
wherein the elements of the second dataset include both structured and unstructured data;
wherein said dataset flow quality value determinations are based, at least in part, on whether the respective determined dataset ages are greater than the associated dataset age thresholds; and
wherein said dataset flow quality values are determined, by said computer, to be beyond said dataset flow quality threshold in response to a determination that the associated dataset age is greater than the associated element age value threshold.

3. The method of claim 2, wherein:
said computer receives the content sufficient for the computer to determine the dataset age in response to a Structured Query Language (SQL) request being made by said computer that returns, for an associated dataset, a dataset flow query timestamp indicating a chronological time associated with said dataset flow quality value determination, and a representative element timestamp indicating a chronological time at which a representative element in the associated dataset was generated; and wherein said associated dataset ages are each based, at least in part, on a time difference between the dataset flow query timestamps and associated representative element timestamps.

4. The method of claim 1, wherein:
said metadata further includes at least one dataset attribute selected from the group consisting of: a dataset source account label, and at least one data element type label; and
wherein said consolidated data record dataset flow quality correction action includes providing a message to a user interface operatively associated with the data sources associated with datasets having a dataset flow quality value beyond said dataset flow quality threshold indicating the dataset flow quality value and associated selected attribute thereof.

5. The method of claim 4, wherein said computer, responsive to providing said message, receives at least one corrected dataset from a data source associated with the dataset for which the message was sent.

6. The method of claim 1, wherein:
the health quality attributes that the first dataset health quality values are based on includes at least: data completeness, data consistency, data accuracy, and data validity,
wherein the health quality attributes that the second dataset health quality values are based on includes at least: data completeness, data consistency, data accuracy, and data validity,
wherein the second dataset health quality values are determined by computing a percentage of the records of the second dataset that match boundaries of a range of second expected HQAVs.

7. The method of claim 6, wherein:
said dataset health quality correction action includes providing a message to a user interface operatively associated with the data sources associated with datasets having a dataset health quality value beyond said dataset health quality threshold indicating the dataset flow quality value thereof,
wherein the at least one dataset health quality value is determined to be beyond the associated one of the determined acceptable dataset health quality threshold values that the at least one dataset health quality value is compared with in response to a determination that the at least one dataset health quality value is determined to be greater than the associated one of the determined acceptable dataset health quality threshold values.

8. The method of claim 7, wherein said computer, responsive to providing said message, receives at least one corrected dataset from a data source associated with the dataset for which the message was sent.

9. The method of claim 1, wherein the sets of metadata specify expected values, and comprising:
determining the expected values from the received metadata;
wherein said metadata includes a consolidation confidence threshold for the consolidated data record;
wherein, for the consolidated data record, said computer determines a first consolidation confidence value and a second consolidation confidence value, wherein the consolidation confidence values are based, at least in part, on whether a preselected attribute of the respective elements associated with a first field and a second field include the expected values and whether the respective elements have a classification type as opposed to being unclassified; and wherein said computer compares the consolidation confidence values of the consolidated data record to the consolidation confidence threshold and, based on said comparison, determines whether either of the consolidation confidence values for the consolidated data record is unacceptable and provides, in accordance with said determination, a message indicating the unacceptability to a user interface operatively associated with data sources of said elements having said unacceptable consolidation confidence value, wherein the unacceptable consolidation confidence value is based on an improper categorization of the elements in the datasets, wherein the message details the improper categorization of the elements.

10. The method of claim 9, wherein said consolidation confidence value is determined by said computer to be unacceptable in response to a determination that the first field and/or the second field do not include the determined expected values.

11. A system to remediate data quality issues in a consolidated data record that includes elements from a plurality of datasets, which comprises:
a computer system comprising a computer readable storage medium having program instructions embodied therewith, the program instructions executable by a computer to cause the computer to:
source a first dataset from a data lake and a second dataset from the data lake;
wherein sets of metadata respectively associated with the datasets are received with the first dataset and the second dataset;
directly measure, based at least in part on dataset feed information, a first dataset flow quality value for the first dataset and a second dataset flow quality value for the second dataset for a consolidated data record resulting from combining a plurality of datasets;
determine a predetermined dataset flow quality threshold value from the received metadata;
responsive to said dataset flow quality value determinations, compare said dataset flow quality values with the predetermined dataset flow quality threshold value and, in response, conduct a consolidated data record dataset flow quality correction action for datasets having a dataset flow quality value beyond said dataset flow quality threshold value until the datasets having a dataset flow quality value beyond said dataset flow quality threshold are corrected to have dataset flow quality values not beyond the dataset flow quality threshold value;
responsive to a determination that all of the first dataset and the second dataset have and/or are corrected to have dataset flow quality values not beyond the dataset flow quality threshold value, determine, based at least in part on dataset element health information, a plurality of first dataset health quality values for said first dataset and a plurality of second dataset health quality values for said second dataset, wherein the first dataset health quality values are based on different types of health quality attributes, wherein the second dataset health quality values are based on a different types of health quality attributes, wherein the first dataset health quality values are determined by computing a percentage of the records of the first dataset that match boundaries of a range of first expected health quality attribute values (HQAVs), wherein the second dataset health quality values are determined by computing a percentage of the records of the second dataset that match boundaries of a range of second expected HQAVs;
determine a plurality of acceptable dataset health quality threshold values from the received metadata; and
responsive to said dataset health quality value determinations, compare said health quality values with the determined acceptable dataset health quality threshold values and, in response, conduct a dataset health quality correction action for datasets having at least one dataset health quality value beyond an associated one of the determined acceptable dataset health quality threshold values that the at least one dataset health quality value is compared with.

12. The system of claim 11, wherein:
said dataset feed information includes, for the datasets, dataset age thresholds and content sufficient for said computer to determine ages of the datasets;
wherein said instructions further cause said computer to determine a dataset age of the first dataset and a dataset age of the second dataset,
wherein the dataset age of the first dataset is an average age of elements of the first dataset,
wherein the dataset age of the second dataset is an average age of elements of the second dataset,
wherein the elements of the first dataset include both structured and unstructured data,
wherein the elements of the second dataset include both structured and unstructured data;
wherein said dataset flow quality value determinations are based, at least in part, on whether the respective determined dataset ages are greater than the associated dataset age thresholds; and
wherein said instructions further cause said computer to determine said dataset flow quality values are beyond said dataset flow quality threshold in response to a determination that the associated dataset age is greater than the associated element age value threshold.

13. The system of claim 12, wherein:
said instructions further cause said computer to receive the content sufficient for the computer to determine the dataset age in response to a Structured Query Language (SQL) request being made by said computer that returns, for an associated dataset, a dataset flow query timestamp indicating a chronological time associated with said dataset flow quality value determination, and a representative element timestamp indicating a chronological time at which a representative element in the associated dataset was generated; and
wherein said associated dataset ages are based, at least in part, on a time difference between the dataset flow query timestamps and associated representative element timestamps.

14. The system of claim 11, wherein:
said metadata further includes at least one dataset attribute selected from the group consisting of: a dataset source account label, and at least one data element type label; and
wherein said consolidated data record dataset flow quality correction action includes further instructions for said computer to provide a message to a user interface operatively associated with the data sources associated with datasets having a dataset flow quality value beyond said dataset flow quality threshold indicating the dataset flow quality value and associated selected attribute thereof.

15. The system of claim 14, wherein said computer, responsive to providing said message, receives at least one corrected dataset from a data source associated with the dataset for which the message was sent.

16. The system of claim 11, wherein:
the health quality attributes that the first dataset health quality values are based on includes at least: data completeness, data consistency, data accuracy, and data validity,
wherein the health quality attributes that the second dataset health quality values are based on includes at least: data completeness, data consistency, data accuracy, and data validity.

17. The system of claim 11, wherein the sets of metadata specify expected values, and the program instructions executable by the computer to cause the computer to:
determine the expected values from the received metadata;
wherein said metadata includes a consolidation confidence threshold for the consolidated data record;
wherein, for the consolidated data record, said instructions further cause said computer to determine a first consolidation confidence value and a second consolidation confidence value, wherein the consolidation confidence values are based, at least in part, on whether a preselected attribute of the respective elements associated with a first field and a second field include the expected values and whether the respective elements have a classification type as opposed to being unclassified;
wherein said instructions further cause said computer to compare the consolidation confidence values of the consolidated data record to the consolidation confidence threshold and, based on said comparison, to determine whether either of the consolidation confidence values for the consolidated data record is unacceptable and provide, in accordance with said determination, a message indicating the unacceptability to a user interface operatively associated with data sources of said elements having said unacceptable consolidation confidence value, wherein the unacceptable consolidation confidence value is based on an improper categorization of the elements in the datasets, wherein the message details the improper categorization of the elements; and
correcting the improper categorization of the elements in the datasets.

18. The system of claim 17, wherein said preselected attribute is a status value of said elements associated with said first and second fields, and said consolidation confidence value is determined by said computer to be unacceptable in response to a determination that the status value of said elements does not match the expected value.

19. A computer program product to remediate data quality issues in a consolidated data record that includes elements from a plurality of datasets, the computer program product comprising a computer readable storage medium having program instructions embodied therewith, the program instructions executable by a computer to cause the computer to:
source, using said computer, a first dataset from a data lake and a second dataset from the data lake,
wherein sets of metadata respectively associated with one of the datasets is received with the first dataset and the second dataset,
directly measure, using said computer, based at least in part on dataset feed information, a first dataset flow quality value for the first dataset and a second dataset flow quality value for the second dataset for a consolidated data record resulting from combining a plurality of datasets;
determine, using said computer, a predetermined dataset flow quality threshold value from the received metadata;
responsive to said dataset flow quality value determinations, compare, using said computer, said dataset flow quality values with the predetermined dataset flow quality threshold value and, in response, conduct, using said computer, a consolidated data record dataset flow quality correction action for datasets having a dataset flow quality value beyond said dataset flow quality threshold value until the datasets having a dataset flow quality value beyond said dataset flow quality threshold are corrected to have dataset flow quality values not beyond the dataset flow quality threshold value,
wherein said dataset feed information includes, for the datasets, dataset age thresholds and content sufficient for said computer to determine dataset ages,
wherein said computer determines a dataset age of the first dataset and a dataset age of the second dataset,
wherein the dataset age of the first dataset is an average age of elements of the first dataset, wherein the dataset age of the second dataset is an average age of elements of the second dataset,
wherein said dataset flow quality value determinations are based, at least in part, on whether the respective determined dataset ages are greater than the associated dataset age thresholds,
wherein said dataset flow quality values are determined, by said computer, to be beyond said dataset flow quality threshold in response to a determination that an associated dataset age is greater than the associated element age value threshold,
wherein the associated dataset age is defined by a difference between a dataset flow query timestamp and an associated representative element timestamp;
responsive to a determination that all of the first dataset and the second dataset have and/or are corrected to have dataset flow quality values not beyond the dataset flow quality threshold value, determine, using said computer, based at least in part on dataset element health information, a plurality of first dataset health quality values for said first dataset and a plurality of second dataset health quality values for said second dataset, wherein the first dataset health quality values are based on a different type of health quality attribute, wherein the second dataset health quality values are based on different types of health quality attributes, wherein the first dataset health quality values are determined by computing a percentage of the records of the first dataset that match boundaries of a range of first expected health quality attribute values (HQAVs), wherein the second dataset health quality values are determined by computing a percentage of the records of the second dataset that match boundaries of a range of second expected HQAVs;
determine, using said computer, a plurality of acceptable dataset health quality threshold values from the received metadata; and
responsive to said dataset health quality value determinations, compare, using said computer, said health quality values with an associated one of the determined acceptable dataset health quality threshold values and, in response, conduct a dataset health quality correction action for datasets having at least one dataset health quality value beyond an associated one of the determined acceptable dataset health quality threshold values that the at least one dataset health quality value is compared with.

20. The computer program product of claim 19, wherein:

said metadata includes a consolidation confidence threshold for the consolidated data record;

wherein, for the consolidated data record, said instructions further cause said computer to determine a first consolidation confidence value and a second consolidation confidence value based, at least in part, on a preselected attribute of the respective elements associated with a first field and a second field and whether the respective elements have a classification type as opposed to being unclassified; and wherein said instructions further cause said computer to compare the consolidation confidence values of the consolidated data record to the consolidation confidence threshold and, based on said comparison, to determine whether either of the consolidation confidence values for the consolidated data record is unacceptable and provide, in accordance with said determination, a message indicating the unacceptability to a user interface operatively associated with the data sources of element having said unacceptable consolidation confidence value, wherein the unacceptable consolidation confidence value is based on an improper categorization of the elements in the datasets, wherein the message details the improper categorization of the elements;

and the program instructions executable by a computer to cause the computer to:

execute, using said computer, a Structured Query Language (SQL) request for timestamp information associated with the dataset; and receive, using said computer, timestamp information in response to executing the SQL request, wherein the timestamp information includes the dataset flow query timestamp indicating a chronological time associated with said dataset flow quality value determination, and the associated representative element timestamp indicating a chronological time at which the associated representative element in the associated dataset was generated.

* * * * *